Sept. 4, 1962         N. A. SCHUSTER         3,052,834
MAGNETIC RESONANCE METHODS AND APPARATUS
Filed Dec. 6, 1954         4 Sheets-Sheet 1
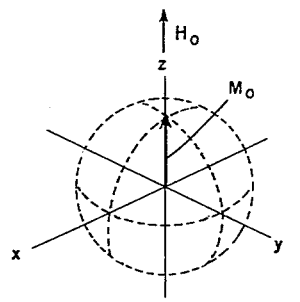
FIG. IA
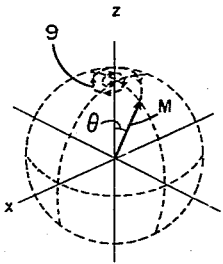
FIG. IB
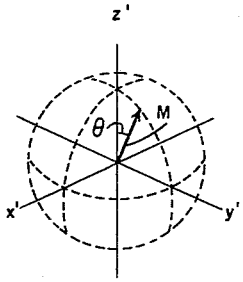
FIG. IC
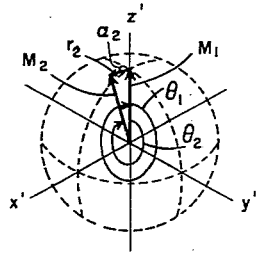
FIG. ID
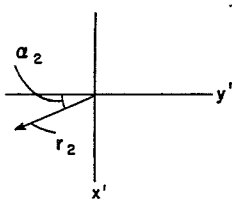
FIG. IE
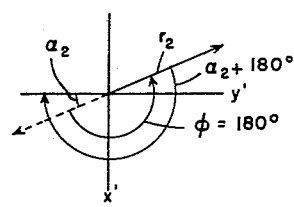
FIG. IF
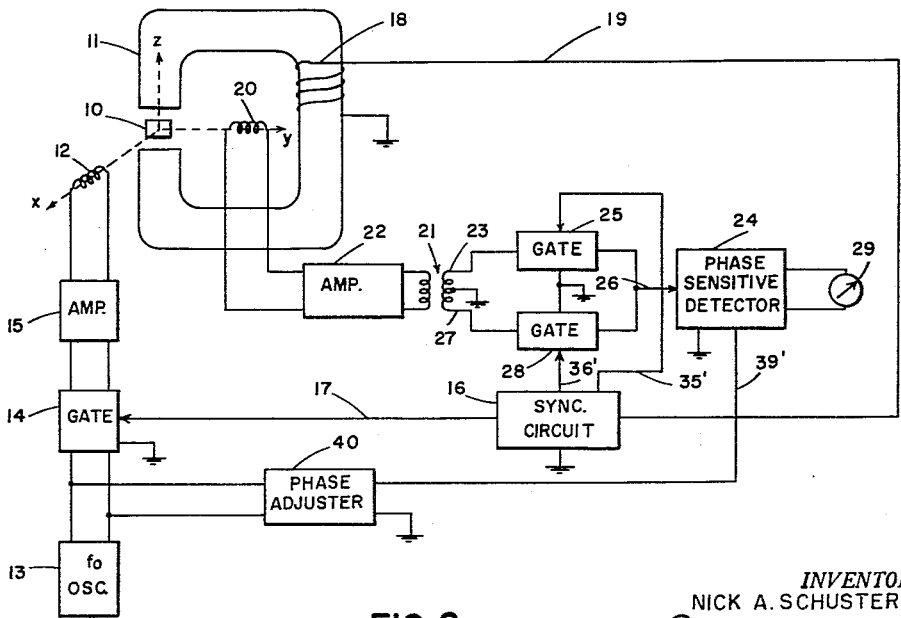
FIG. 2
*INVENTOR.*
NICK A. SCHUSTER.
BY
HIS ATTORNEY.

INVENTOR.
NICK A. SCHUSTER.

United States Patent Office 3,052,834
Patented Sept. 4, 1962

3,052,834
MAGNETIC RESONANCE METHODS
AND APPARATUS
Nick A. Schuster, Ridgefield, Conn., assignor to Schlumberger Well Surveying Corporation, Houston, Tex., a corporation of Texas
Filed Dec. 6, 1954, Ser. No. 473,112
10 Claims. (Cl. 324—.5)

The present invention relates to magnetic resonance methods and apparatus, and more particularly to new and improved methods and apparatus for increasing substantially the observable signal in magnetic resonance techniques and which may be particularly useful, for example, in the non-destructive chemical analysis of materials, and in measurements of weak magnetic fields.

Nuclear and other paramagnetic resonances have been observed in the past, as disclosed, for example, in Patent No. 2,561,489, issued July 24, 1951, to Bloch and Hansen. In general, a sample exhibiting paramagnetic properties is placed in a constant, unidirectional magnetic field that is substantially homogeneous within the sample. A radio-frequency activated coil at right angles to the constant magnetic field generates an alternating magnetic field in the sample. The frequency of the alternating magnetic field is selected equal to the resonance precession frequency of the paramagnetic particles in the constant field. The resonance may be observed, for example, in one of the following ways: (1) as a result of the absorption of energy from the alternating magnetic field; (2) as a result of the voltage at the precession frequency induced in a coil at right angles to both the constant magnetic field and the axis of the alternating field inducing coil; or (3) by modulating either or both of the magnetic fields, and detecting the effects of the modulation in accordance with either of the first two methods above.

Such methods have been successful in the carefully controlled conditions of a laboratory, particularly where the sample under investigation is in fluid form, since both the constant and the alternating magnetic fields may be made almost completely homogeneous within the sample, and the frequency of the alternating field may be maintained at the resonance precession frequency. Prior to the application of the alternating magnetic field, the individual macroscopic magnetic moments associated with each volume element in the paramagnetic sample under investigation are lined up with the constant, unidirectional magnetic field. When the alternating magnetic field is applied to the sample, each individual macroscopic moment will move relative to the unidirectional magnetic field in a path known as a nutation. The angular velocity and direction of the nutation for each macroscopic moment is directly dependent on the intensities of the unidirectional and the alternating magnetic fields within the particular volume element with which such moment is associated. Where the fields are completely homogeneous within the sample under investigation, each volume element of the sample will be in magnetic fields of the same intensities. Thus the macroscopic moments associated with each volume element will nutate at the same angular velocity and in the same direction and will remain together as they nutate, i.e., the phase coherence of the individual macroscopic moments will be maintained.

However, where the fields are not homogeneous, individual volume elements will be in fields of different intensities and the nutations of the individual macroscopic moments which are dependent on such intensities will be at different angular velocities and in different directions. It can be seen that the individual macroscopic moments will not remain lined up with each other, but to the contrary, will become further and further divergent with continued application of the alternating magnetic field. The rate of divergence is a function of the degree of field inhomogeneities. This "disorder" effect, i.e., the cumulative loss of phase coherence of the individual macroscopic moments, very quickly attenuates the total macroscopic moment associated with all volume elements in the material under observation, whereby the detectable signal is quickly lost in the disorder.

Accordingly, it is a primary object of the present invention to provide new and improved methods and apparatus for observing paramagnetic resonance phenomena, that are useful, for example, in non-destructive chemical analysis, and in the measurement of magnetic fields.

Another object of the invention is to provide paramagnetic resonance detecting methods and apparatus in which the required degree of frequency stability and of magnetic field homogeneity is less critical.

A further object of the invention is to provide paramagnetic resonance detecting methods and apparatus giving increased signal-to-noise ratio, whereby the signal resulting from precession is more readily and accurately observed.

These and other objects of the invention are attained by applying an alternating magnetic field of given intensity to paramagnetic particles during a period when a unidirectional magnetic field is applied to said particles substantially at right angles to said alternating field and is constant at a first intensity. The frequency of the alternating magnetic field is selected substantially equal to the resonance precession frequency of the particular paramagnetic particles in the unidirectional field at said first intensity. Periodically the intensity of the unidirectional field is changed from said first intensity to a second predetermined intensity and then back to said first intensity. The intensity of the unidirectional magnetic field is changed to said second intensity at times when the macroscopic moments associated with volume elements in magnetic fields of the desired intensities are in line with the constant magnetic field, while at the same time other macroscopic moments associated with volume elements not in magnetic fields of the desired intensities as a result of field inhomogeneities are not exactly in line with the unidirectional magnetic field, and thus have components perpendicular to the unidirectional magnetic field. During the intervals in which the unidirectional field has the second intensity and as a result of the change in field intensity, the macroscopic moments which are not in line with the unidirectional field are rotated about the direction of the unidirectional field to a position such that the relative direction of these macroscopic moment components which are perpendicular to the unidirectional magnetic field is reversed. Thereafter when the unidirectional field is returned to said first intensity, continued application of the alternating magnetic field will cause the macroscopic moments to become realigned with the unidirectional field, thereby correcting the disorder in the macroscopic moments. Thus phase coherence of these moments is maintained, whereby the total macroscopic moment remains relatively unattenuated even in the presence of substantial inhomogeneities in the magnetic fields, and with deviations in the frequency of the alternating field from the resonance precession frequency.

In one form of the invention the alternating magnetic field is applied successively during discrete pulses, and the intensity of the unidirectional magnetic field changed to the second intensity in the intervals between pulses. In another form of the invention, the alternating magnetic field is applied continuously and the unidirectional field intensity is pulsed periodically.

In my copending application Serial No. 463,776, filed October 21, 1954, now U.S. Patent No. 2,968,762, granted January 17, 1961, for "Magnetic Resonance Methods and Apparatus" there are described other highly effective methods and apparatus for minimizing the aforementioned "disorder" effects, in which the phase of the alternating magnetic field is periodically reversed. In another form of the present invention, the principles of the aforementioned application may be utilized to further reduce the disorder. In general, the intensity of the unidirectional magnetic field is changed to the second intensity at times when the total nutation of the macroscopic moments by the alternating field of one phase is equal to the total nutation by the alternating field of opposite phase, for macroscopic moments associated with volume elements in fields of the desired intensities.

The invention will be more fully understood with reference to the accompanying drawings, in which:

FIG. 1 is a series of vector diagrams employed to explain the invention;

FIG. 2 represents typical apparatus constructed in accordance with the invention;

Figure 3:
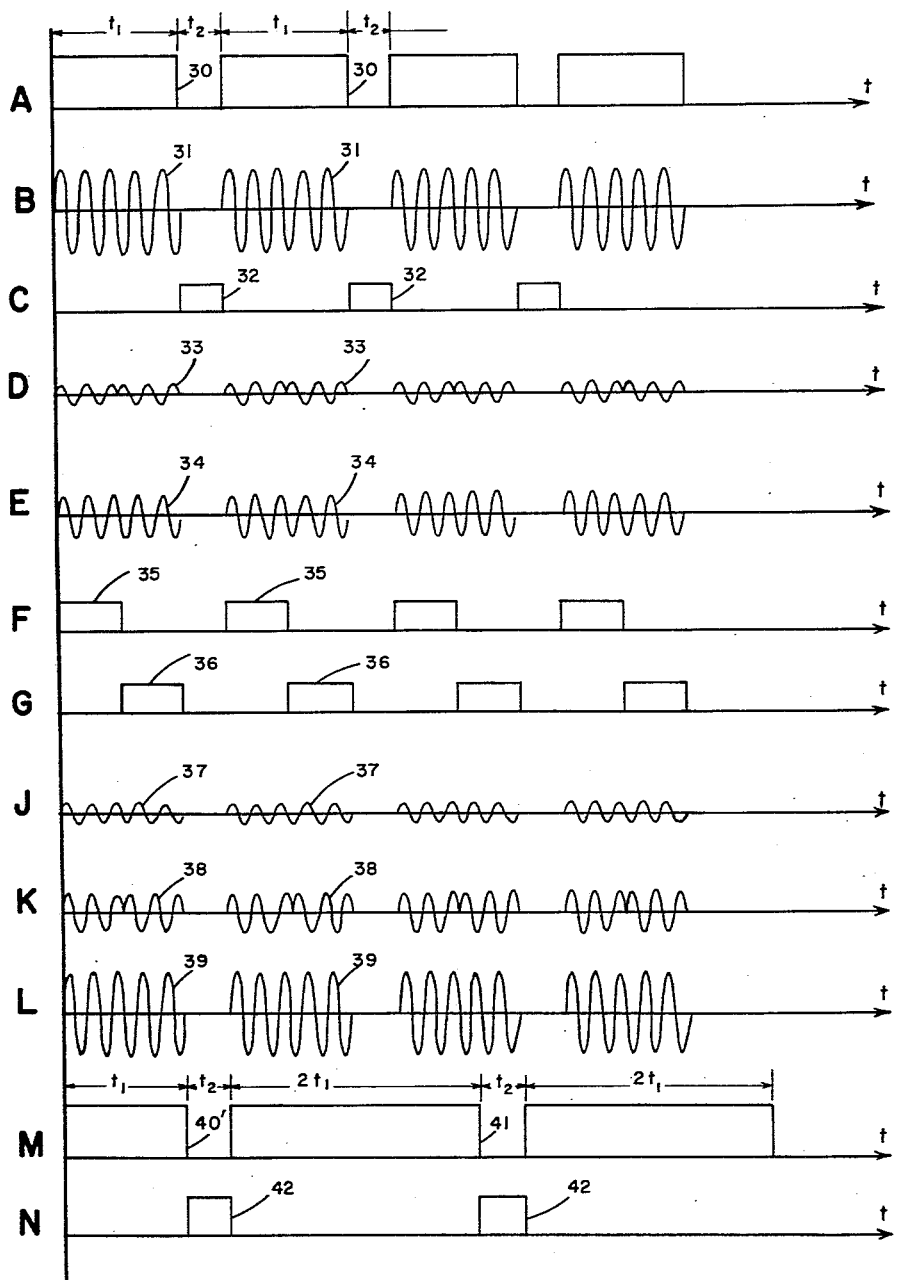
FIG. 3 is a series of pulse diagrams to show various modifications of the invention.

A brief explanation of some of the principles of magnetic resonance may be of assistance in understanding the invention. In the three-dimensional vector diagram shown in FIG. 1A where the particles exhibiting paramagnetic properties are at the junction of the respectively perpendicular $x$, $y$ and $z$ axes, a constant magnetic field of intensity $H_0$ is applied along the $z$ axis to the paramagnetic particles. After a period of time sufficient for thermal equilibrium to be reached, the total macroscopic magnetic moment $M_0$ associated with the particles in the field $H_0$ is lined up with the constant field $H_0$ along the $z$ axis. If now an R.F. coil having its longitudinal axis coincident with the $x$ axis is activated with an R.F. signal of frequency equal to the resonance precession frequency $f_0$, where $$f_0 = \gamma H_0/2\pi \quad (1)$$

and $\gamma$ is a constant (the gyromagnetic ratio) for the particular particles under observation, an alternating magnetic field is generated which effectively rotates about the $z$ axis in the $x$, $y$ plane clockwise at the frequency $f_0$. The total macroscopic moment $M$ will then precess about the $z$ axis in a spiral path 9 and nutate through an angle $\theta$, as shown in FIG. 1B. The nutation will be more readily visualized if we place ourselves in a frame of reference rotating clockwise about the $z$ axis at the frequency $f_0$. In this frame, the nutation of macroscopic moment $M$ will appear to be a pure rotation through the angle $\theta$ in the rotating plane $y'z'$, as shown in FIG. 1C, where the respectively perpendicular axes are designated $x'$, $y'$ and $z'$ when the nutation is considered from the rotating frame of reference, the axes $x'$ and $y'$ rotating clockwise about axis $z'$ at the frequency $f_0$. At any given instant the angle $\theta$ is given by $$\theta = \gamma H_1 t \quad (2)$$

where $H_1$ is the intensity of the component of the alternating magnetic field rotating clockwise at the frequency $f_0$, and $t$ is the time elapsed since the application of the alternating field. As is well-known, the actual applied intensity of the alternating field must be $2H_1$ since only one-half of this field is effective. Hereinafter only the effective intensity $H_1$ will be referred to, it being understood that the actual intensity must be twice this value.

This explanation is satisfactory where the fields are perfectly homogeneous or nearly so. Let us consider the effect of field inhomogeneities. Individual macroscopic moments associated with volume elements not in fields of the intensities $H_1$ or $H_0$, will not nutate through the angle $\theta$, nor will they remain in the plane $y'z'$ rotating at frequency $f_0$, as can be seen from Relations 2 and 1 respectively. For example, as shown in FIG. 1D, when the macroscopic moments $M_1$ of volume elements in fields of intensity $H_1$ and $H_0$ have nutated 360° back to the $z'$ axis after a period of time determined in accordance with Relation 2 above ($\theta = 2\pi$), a representative individual macroscopic moment $M_2$ of a volume element in fields other than $H_1$ and $H_0$ will not be lined up with the $z'$ axis nor will it be in the $y'z'$ plane. As shown in FIG. 1E, in the $x'y'$ plane, moment $M_2$ will have a component of amplitude $r_2$ making an angle $\alpha_2$ with the negative $y'$ axis. Other individual macroscopic moments $M_3$, $M_4$, etc. (not shown), in fields respectively different from $H_1$ and $H_0$ and from each other will have different components $r_3$, $r_4$, etc., in the $x'y'$ plane, making different angles $\alpha_3$, $\alpha_4$, etc., with the negative $y'$ axis. After one 360° nutation, the $r$ components will be relatively small but the angles $\alpha$ may be in the full range from 0° to 360°. However, with continued application of the R.F. field $H_1$, these moments will continue to fan out, e.g., $\alpha$ will vary and $r$ will increase, until the individual macroscopic moments are randomly distributed about the sphere, thus completely destroying the total macroscopic moment, i.e., the vector sum of the individual macroscopic moments, whereby the detectable resonance precession signal is destroyed.

In accordance with the present invention, this cumulative fanning out is substantially prohibited. For example, after thermal equilibrium has been reached as shown in FIG. 1A, the R.F. field is applied for a time $t_1$ such that macroscopic moments $M_1$ from volume elements in fields of intensity $H_1$ and $H_0$ are nutated in the $y'z'$ plane through an angle $\theta_1 = 360°$ back to the $z'$ axis, while other macroscopic moments from volume elements in fields other than $H_1$ and $H_0$ are scattered near moment $M_1$, as shown by representative moment $M_2$ in FIG. 1D which has nutated through an angle $\theta_2 \neq 360°$ out of the rotating plane $y'z'$. The R.F. field is then turned off and the intensity of the unidirectional field changed from intensity $H_0$ to an intensity $H_0'$, where $H_0'$ may be greater or less than $H_0$ but where the difference between intensities $H_0$ and $H_0'$ is large compared to one half the maximum difference in field intensity resulting from inhomogeneity in the unidirectional magnetic field; i.e., $|H_0 - H_0'| \gg \Delta H_0$, where $\Delta H_0$ is the half width of the field inhomogeneity in the unidirectional field. This will change the resonance precession frequency of the particles under observation as can be seen from Relation 1 above, and as a result, the individual macroscopic moments which are not in line with the unidirectional field along the $z'$ axis will rotate at the new frequency relative to the frame of reference $y'z'$ which is rotating at frequency $f_0$. Thus the $x'y'$ components of the individual macroscopic moments, including moment $M_2$, will rotate in the $x'y'$ plane, at the new frequency through an angle $\phi$ relative to the $y'z'$ plane which is rotating at the original frequency $f_0$, as shown in FIG. 1F, such that $$\phi = \gamma |H_0 - H_0'| t \quad (3)$$

After a given time $t_2$ during which field $H_0'$ is applied, the $x'y'$ components of the individual macroscopic moments such as the moment $M_2$ will have rotated 180° ($\phi = \pi$ in Relation 3 above), whereby the component $r_2$ of moment $M_2$ in the $x'y'$ plane now makes an angle $\alpha + 180°$ with the negative $y'$ axis, while moment $M_1$ remains in line with the $z$ axis since it had no $x'y'$ component. Thus moment $M_2$ now makes an angle $-\theta_2$ (instead of $+\theta_2$) with respect to the $z'$ axis.

At this instant the intensity of the constant field is brought back to $H_0$ and the R.F. field $H_1$ reapplied. After another time interval of duration $t_1$, the moment $M_1$ will again nutate through the same angle $\theta_1 = 360°$ and will again be re-aligned with the $z'$ axis. Similarly, moment $M_2$ will again nutate through the angle $+\theta_2$, since moment $M_2$ is in the same magnetic field as before, of intensities different from $H_0$ and $H_1$. However, since at the beginning of the second interval $t_1$ moment $M_2$ made an angle $-\theta_2$ with respect to the $z'$ axis, at the end of the second interval $t_1$ moment $M_2$ will also be lined up with the $z'$ axis. The same is true of all individual macroscopic moments in fields other than $H_0$ and $H_1$. By successively repeating the intervals $t_1$ and $t_2$ in which $H_1$ is applied and $H_0$ is changed, respectively, it can be seen that the phase coherence of the individual macroscopic moments is maintained whereby the total macroscopic moment is maintained relatively unattenuated, thus permitting a large resonance precession signal to be detected even in the presence of substantial inhomogeneities in fields $H_1$ and $H_0$.

In FIG. 2 is shown in block diagram form apparatus for detecting magnetic resonance in accordance with the foregoing principles. A sample 10 to be tested is placed between the pole faces of a magnet 11 providing a constant magnetic field of average intensity $H_0$ in sample 10, though the actual magnetic field intensity will differ between different volume elements in sample 10 due to field inhomogeneity. While magnet 11 is shown as a permanent magnet, it is preferably an electromagnet. An R.F. coil 12 is placed at right angles to the magnetic field $H_0$ in sample 10, and is activated periodically at the frequency $f_0$, the resonance precession frequency for the particular paramagnetic particles under investigation in the field $H_0$, by means of crystal-controlled oscillator 13, gate circuit 14 and amplifier 15. Gate circuit 14 receives gating pulses from synchronizing circuit 16 via conductor 17.

A coil 18 wound on magnet 11 is adapted to increase or decrease the magnetic field in sample 10 to intensity $H_0'$ when coil 18 is activated by a suitable D.C. pulse from circuit 16 via conductor 19.

When the induction method of detecting resonance is employed, an R.F. detecting coil 20, at right angles to the field $H_0$ and the axis of coil 12 through sample 10, is connected to a phase-splitting circuit 21 via amplifier 22. One output 23 of phase-splitting circuit 21 is connected to balanced phase-sensitive detector 24 via gate circuit 25 and conductor 26. The other output 27 of phase-splitting circuit 21 is connected to detector 24 via gate circuit 28 and conductor 26. Gate circuits 25 and 28 are opened by pulses from circuit 16 received on conductors 35' and 36', respectively. Detector 24 receives a sensitizing or reference signal from oscillator 13 via phase adjuster 40' and conductor 39'. The output of detector 24 may be indicated on a meter 29.

In operation, assume that it is desired to detect proton resonance ($\gamma = 2.67 \times 10^4$) in sample 10, and that $H_0 = 250$ gauss and $\Delta H_0 = 3$ gauss. Under these conditions $f_0$ is equal to 1.06 mc., from Relation 1. Also assume that coil 12, when activated at frequency $f_0$, generates magnetic field $H_1$ of intensity 10 gauss, and that when coil 18 is activated, $H_0' = 275$ gauss, i.e. $H_0 - H_0'| = 25$ gauss $\gg \Delta H_0 = 3$ gauss.

Oscillator 13 generating frequency $f_0$ is normally blocked from coil 12 and amplifier 15 by gate circuit 14. However, when gate circuit 14 is opened by pulses 30 (FIG. 3A) of duration $t_1$, coil 12 is activated by R.F. pulse 31 also of duration $t_1$ as shown in FIG. 3B. From Relation 2, $t_1 = 23.6\mu$ sec. to give a 360° ($\theta = 2\pi$) nutation of macroscopic moments in fields actually equal to $H_1$. During intervals $t_2$ between intervals $t_1$, coil 18 is activated with D.C. pulses 32, thus creating the field $H_0'$ in sample 10. From Relation 3, $t_2 = 4.7\mu$ sec. to give a 180° ($\phi = \pi$) rotation when the difference between $H_0$ and $H_0'$ is 25 gauss.

As indicated in connection with FIG. 1, this arrangement substantially eliminates the disorder in the macroscopic moments in fields different from $H_0$ and $H_1$ in sample 10, whereby the total macroscopic moment and thus the average magnetic resonance signal detectable in coil 20 in a succession of intervals $t_1$ remains relatively unattenuated. The signal 33 of frequency $f_0$ in coil 20 during the intervals $t_1$ resulting from magnetic resonance is shown in FIG. 3D and may be detected in a variety of ways. After a predetermined number of consecutive intervals $t_1$ and $t_2$ during a period short with respect to the relaxation time $T_1$ associated with precession, the R.F. signal is removed from coil 12 for a relaxation interval to permit a degree of repair in the macroscopic moments. Thus one cycle of operation consists of a first period including a predetermined number of consecutive intervals $t_1$ and $t_2$ followed by a relaxation interval, and the cycle may be repeated indefinitely. After a number of cycles, the disorder created during the previous $t_1$, $t_2$ period will be fully repaired during the following relaxation interval. The duration of the relaxation interval depends on the degree of field inhomogeneities encountered and on the number of $t_1$, $t_2$ intervals during one cycle. Where substantial inhomogeneities are encountered, it may be necessary that the relaxation interval be 3 to 30 times the duration of a $t_1$, $t_2$ period.

However, since coils 12 and 20 cannot as a practical matter be perfectly at right angles, an undesired signal 34 (FIG. 3E) as a result of the direct coupling between coils 12 and 20 will be induced in coil 20 in addition to desired signal 33. It should be noted, however, that resonance signal 33 reverses phase midway during intervals $t_1$, and this effect may be utilized to separate signal 33 from undesired signal 34. After amplification by amplifier 22, signals 33 and 34 are fed to phase-splitting circuit 21, the outputs 23 and 27 of which are of equal amplitude but of opposite polarity (180° out of phase with each other). When gate circuit 25 is activated by pulses 35 during the first half of each interval $t_1$, the first half of signals 33 and 34 go straight through to detector 24. When gate circuit 28 is activated by pulses 36 during the second half of each interval $t_1$, the second half of signals 33 and 34 are applied to detector 24, but with reversed polarity. Thus, as shown in FIGS. 3J and K, resonance signal 33 becomes signal 37 of no phase reversals, while undesired induced signal 34 becomes signal 38, which reverses phase midway during the intervals $t_1$. Balanced phase-sensitive detector receives a sensitizing (reference) signal 39 from conductor 39' in phase with signal 37. Thus the output of detector 24 resulting from signal 37 will be a D.C. signal of constant polarity, while the polarity of the signal resulting from undesired signal 38 will reverse midway during intervals $t_1$ and may thus be filtered out by suitable time constant circuits. Accordingly, meter 29 is responsive to the amplitude of resonance signal 33.

From the explanation given in connection with FIG. 1, it will be appreciated that at the end of the second interval $t_1$, the macroscopic moments are lined up with the $z$ axis and thus during the second interval $t_2$ the change in magnetic field $H_0'$ actually does not affect the positions of these moments. Accordingly, in order to give more time for measuring resonance, alternate intervals $t_2$ may be eliminated. As shown in FIG. 3M, gate circuit 14 may be opened during a first $t_1$ interval by a pulse 40', followed after interval $t_2$ by a succession of $2t_1$ pulses 41 separated by intervals $t_2$. Coil 18 is activated during intervals $t_2$ by pulses 42. More detailed apparatus for obtaining the pulses shown in FIGS. 3M and N is shown in FIG. 4.

Figure 4:
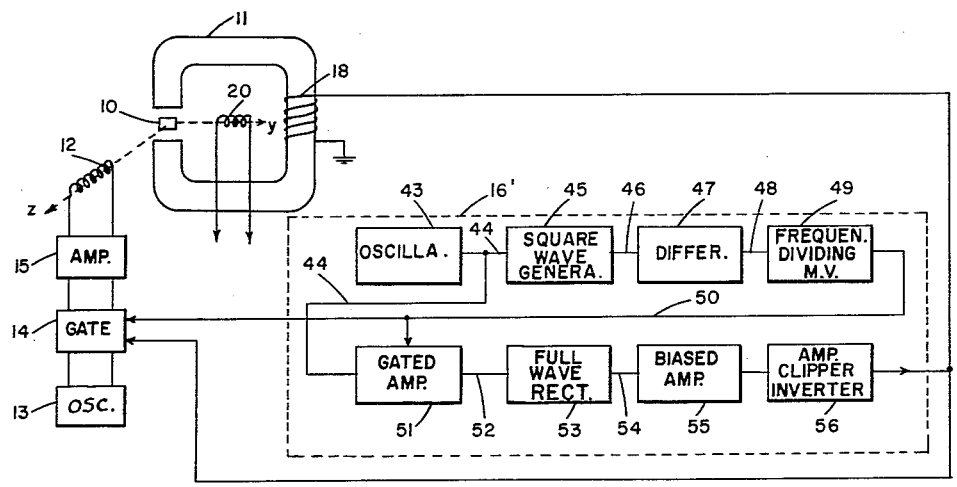
FIG. 4 represents other apparatus constructed in accordance with the invention.
Figure 5:
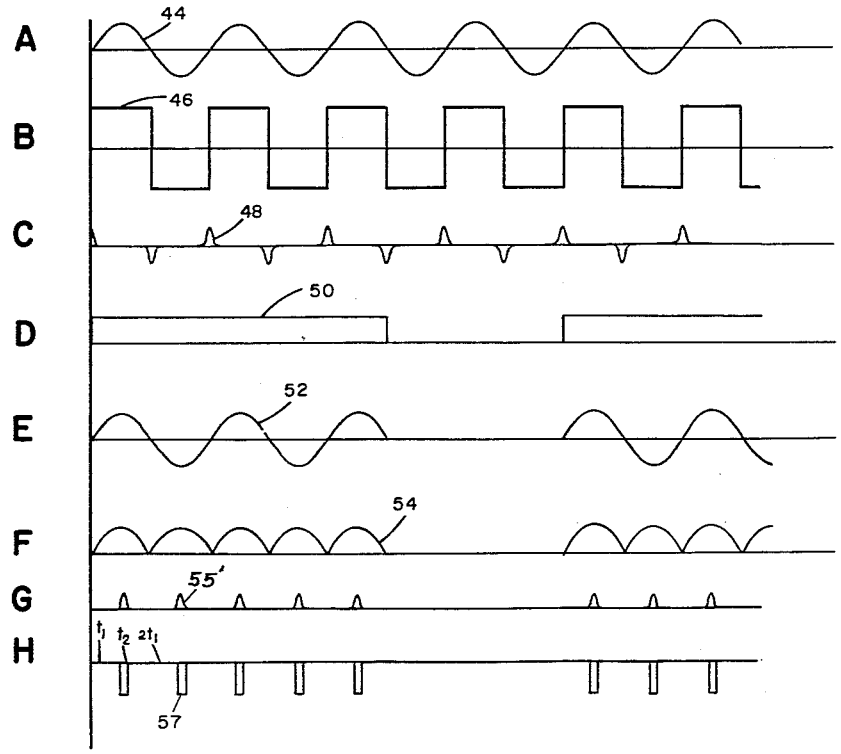
FIG. 5 is a series of pulse diagrams to explain the operation of the apparatus shown in FIG. 4.

In FIG. 4, apparatus having similar function to apparatus in FIG. 2, is given the same numerical designation. In synchronizing generator 16' is an oscillator 43 giving an output signal 44 (FIG. 5A) of frequency equal to $1/(4t_1 + 2t_2)$. In the example given above, therefore, this frequency equals 9650 cycles/sec. Output 44 is fed to a square wave generator 45 which may be a clipper amplifier giving a square wave output 46 of the same frequency. Output 46 is fed to a differentiator 47, the output 48 of which is applied to a frequency dividing multivibrator 49, giving a series of long positive pulses 50. Pulses 50 activate gate circuit 14 and are also fed to gated amplifier 51 which is supplied with signal 44. The output 52 of gated amplifier 51 is fed to full wave rectifier 53, giving an output 54 which is amplified and clipped by circuit 55 as shown in FIG. 5G at 55' and applied to amplifier, clipper and inverter circuit 56, giving a series of negative pulses 57 of duration $t_2$, the first one of which being $t_1$ after pulse 50 and the remainder of which are separated by intervals $2t_1$. The negative pulses 57 are applied to coil 18 to change the field of magnet 11 from $H_0$ to $H_0'$. In addition, pulses 57 are applied to gate 14 to shut it off during intervals $t_2$. The period between pulses 50 is provided to permit thermal equilibrium in sample 10 to be reached between measuring cycles.

Thus, in accordance with the foregoing, macroscopic moments in fields of intensity $H_0$ and $H_1$ are first nutated 360° during the first interval $t_1$; during the first interval $t_2$ following the first interval $t_1$, moments which were not in fields $H_0$ and $H_1$ are rotated 180°; during the interval of duration $2t_1$, another 360° nutation takes place at the end of the first half of this next interval, and the moments not in the proper fields are brought into line with the $z'$ axis; continued application of the R.F. signal for the remainder of the $2t_1$ interval permits another 360° nutation; and after a second $t_2$ interval and one half of another $2t_1$ interval, the disorder is again corrected. This sequence is repeated.

It is not necessary that the R.F. field be removed during the interval $t_2$ when $H_0$ has been changed to $H_0'$, and thus the R.F. may be continuously applied while the field is changed as before. In this instance, however, the period $t_2$ should be as short as possible relative to the period $t_1$, and the difference between $H_0$ and $H_0'$ increased accordingly to give the correct angle $\phi$, as can be seen from Relation 3 above. The apparatus may be similar to that shown in FIGS. 2 and 4, except that in FIG. 2 gating conductor 17 is removed, and in FIG. 4 conductor 50 is disconnected from gate circuit 14. In this case the period $t_2$ would begin just prior to the end of the first period $t_1$ and would end an equal time after the start of the next $t_1$ period, although, in fact, the alternating field is not removed during the $t_2$ intervals. By making $t_2$ as short as possible, substantially no change in the angle $\theta$ occurs during the interval $t_2$. It should be noted that the polarity of the field $H_0'$ may be opposite to that of $H_0$, and the sign + or − must be taken into account in Relation 3.

In the foregoing examples the duration of the $H_0'$ field is selected such that $\phi=\pi$ in Relation 3 above. It will be apparent that $\phi$ may be made equal to odd multiples of $\pi$; however, angles $\phi$ greater than $\pi$ are not recommended where substantial inhomogeneities in fields $H_1$ and $H_0$ are anticipated, since increases in the time during which the $H_0'$ field is applied reduces the time during which resonance measurements may be made, thereby decreasing the signal-to-noise ratio. Also, $\phi$ may be selected equal to less than $\pi$. For example, if $\phi=\pi/2$, after two intervals during which magnetic field $H_0'$ is applied, the disorder in the macroscopic moment will begin to be repaired, rather than after the first interval. Thus $\phi$ may be made equal to $\pi/n$, where $n$ is a whole number, and after $n$ intervals of magnetic field $H_0'$, the disorder will begin to be repaired. However, where $\phi$ is selected equal to less than $\pi$, the disorder will never be fully repaired.

In the foregoing examples, the field is changed from $H_0$ to $H_0'$ at a time when $\theta=2\pi$ in Relation 2 above, and thereafter when $\theta=2\pi$ or $4\pi$. However, it will be apparent that the initial change may take place after multiples of $2\pi$, in general $n2\pi$, and thereafter when $\theta=n2\pi$ or $n4\pi$. However, where substantial field inhomogeneities are anticipated, selection of $n$ greater than 4 is not recommended. It will be understood from my aforementioned copending application that the R.F. signal may be momentarily interrupted during each nutation to permit the resonance measurement to be made during periods when no R.F. signal is present.

In addition, the principles of the present invention may be combined with the principles of my aforementioned application to reduce the disorder in macroscopic moments in fields other than $H_0$ and $H_1$ even further. In general, said application provides for periodic phase reversals of of R.F. signal generating the field $H_1$, and in accordance with the present invention the field $H_0$ may be changed to $H_0'$ to give a $\phi$ rotation in Relation 3 as described above whenever the total angles $\theta$ resulting from nutation by R.F. energy of one phase is equal to the total angles $\theta$ resulting from nutation by the R.F. energy of opposite phase.

Figure 6:
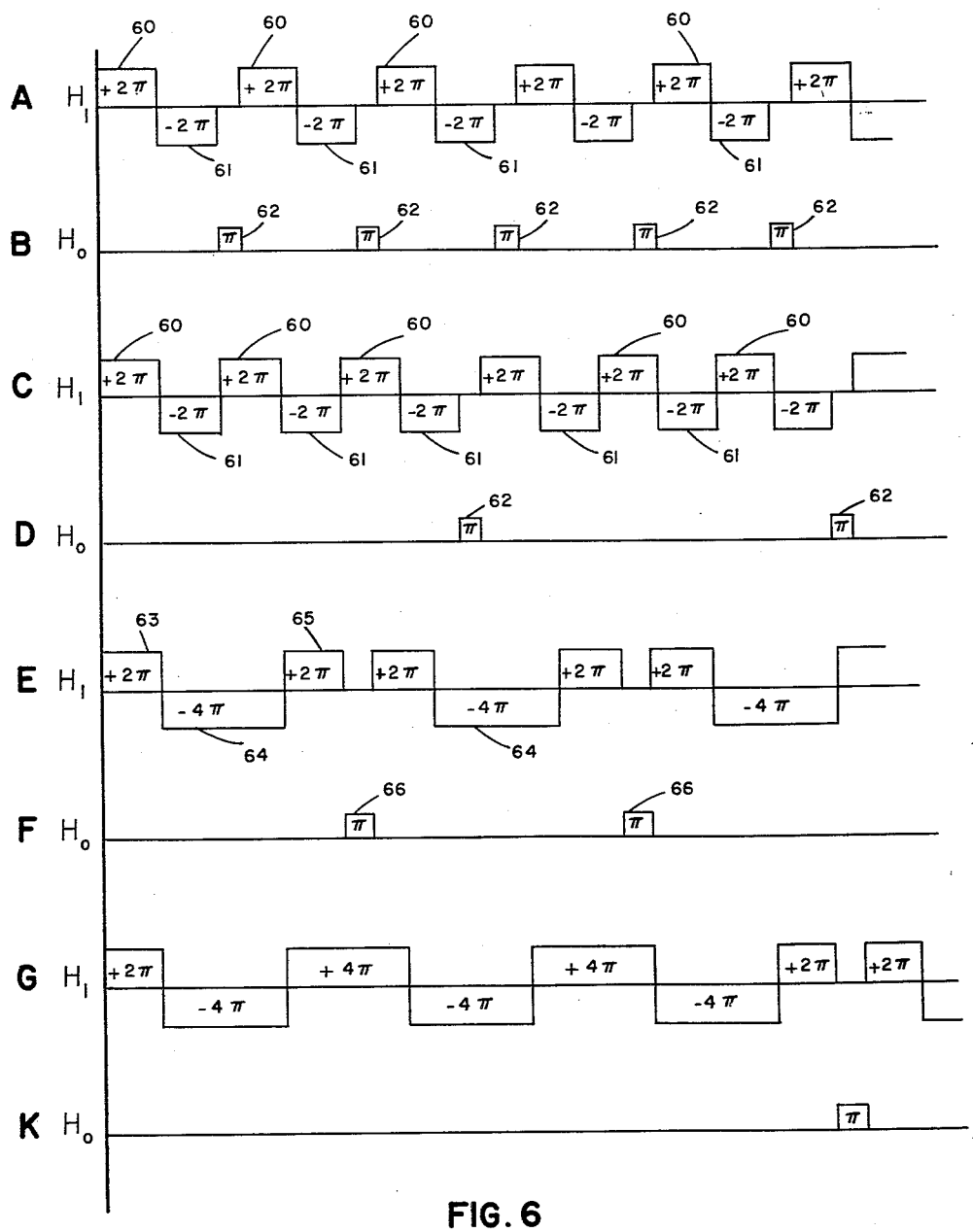
FIG. 6 is another series of pulse diagrams employed to explain additional modifications of the invention.

For example, as shown in FIG. 6A, the R.F. field $H_1$ may be applied during a first interval 60 of sufficient duration to produce a 360° nutation ($\theta=2\pi$ in Relation 2 above). The phase of the R.F. signal is reversed, and the R.F. field applied for a second interval 61 sufficient to produce a second 360° nutation, but since the phase was reversed, the direction of the nutation is reversed as viewed from the rotating frame of reference. After this second interval, the field $H_0$ may be changed to $H_0'$ for a period 62, as shown in FIG. 6B, sufficient to produce a 180° rotation ($\phi=\pi$ in Relation 3 above) and then the cycles 60, 61, 62 repeated with resonance measurements being made during the intervals 60 and 61 as in the aforementioned application. After a predetermined number of cycles 60, 61, 62 during an interval short with respect to the relaxation time involved, the R.F. signal is removed for a period to permit relaxation along the $z'$ axis in the $H_0$ field and then the cycles reapplied. Also, as shown in FIGS. 6C and 6D, the intervals 60 and 61 may be repeated two or more times before the application of the field $H_0'$ during the interval 62. It will be further understood, as described above, that the second and subsequent series of pulses 60 and 61 in FIGS. 6A and 6C may be of twice the duration as the first series. In addition angles $\phi$ in Relation 3 other than $\pi$ radians may be selected, as explained above.

In another example shown in FIGS. 6E and 6F, the first R.F. pulse may be applied for an interval 63 sufficient to produce a 360° nutation ($\theta=2\pi$), the next pulse in which the R.F. is phase reversed for an interval 64 sufficient to produce a 720° nutation ($\theta=4\pi$) followed by a pulse R.F. of the same phase as the first pulse for a duration 65 sufficient to produce a 360° nutation. After a change in field from $H_0$ to $H_0'$ during an interval 66 sufficient to produce a 180° rotation ($\phi=\pi$), the $\theta=+2\pi$, $-4\pi$, $+2\pi$, $\phi=\pi$ cycle may be repeated. In addition, as shown in FIGS. 6G and K, the phase reversing portion of each cycle may be extended by the addition of $+4\pi$, $-4\pi$ R.F. pulses.

In any of the aforementioned examples, the resonance signal may be measured or otherwise utilized during the intervals when the R.F. coil is activated by the dispersion, by the absorption, or by the induction methods of detection as is well-known. Regardless of the detection method employed, if the value of the field $H_0$ is known, the present invention may be employed for chemical analysis of unknown samples, or if the sample is known, the magnitude of the field $H_0$, for example the earth's field, may be determined. The invention finds particular utility in commercial applications where a high degree of field homogeneity may not be practical, for example in well logging techniques as disclosed, for example, in my copending application Serial No. 330,978, filed January 13, 1953, for "Analysis of Substances by the Measurement of Nuclear Magnetic Relaxation Times," or in copending application Serial No. 414,379, filed March 5, 1954, by H. F. Schwede for "Nuclear Resonance Well Logging Method and Apparatus."

Further, in any of the embodiments described above it may be expedient to have alternate variations in the field $H_0$ in opposite senses. Thus the first change in the field $H_0$ may be by an amount A such that $H_0'-H_0=A$, and the next change by an amount $-A$, such that $H_0'-H_0=-A$. It can be seen from Relation 3 above that such alternately oppositely-sensed field changes will produce the same angle $\phi$, but the rotation will be in alternately opposite directions, thereby further reducing the disorder caused by a small error in the desired angle $\phi$, since any such error will be canceled out due to the reversed directions of rotation.

It will be understood that many different apparatus may be employed within the spirit of the invention, and that the specific examples of magnetic field strengths and frequency are merely representative. Thus the appended claims are not limited by the specific embodiments and examples herein disclosed.

In the claims where the macroscopic moment is said to be nutated through a given angle or in a given direction, or where a component of a macroscopic moment is said to be rotated about a given axis, it will be understood that such nutations and rotations are as viewed from the rotating frame of reference described above.

I claim:

1. In a method for obtaining signals representative of magnetic resonance phenomena in particles exhibiting paramagnetic properties wherein a unidirectional magnetic field is applied to said particles, the steps of nutating the macroscopic magnetic moments associated with said particles, and periodically effecting a substantial shift in the average level of said unidirectional magnetic field correspondingly to shift by substantially 180° the precession of the components of said moments perpendicular to said magnetic field, the first such shift occurring the first time said moments have nutated substantially into line with said magnetic field, and subsequent shifts occurring at alternate times when said moments have nutated substantially into line with said magnetic field.

2. In a method for obtaining signals representative of magnetic resonance phenomena in particles exhibiting paramagnetic properties wherein a unidirectional magnetic field is applied to said particles, the steps of nutating the macroscopic magnetic moments associated with said particles, and periodically effecting a substantial shift in the average level of said unidirectional magnetic field correspondingly to shift by substantially 180° the precession of the components of said moments perpendicular to said magnetic field, the first such shift occurring after said moments have nutated a given number of 360° nutations greater than one and are substantially in line with said magnetic field, and subsequent shifts occurring after said moments have nutated twice said given number of 360° nutations and are again substantially in line with said magnetic field.

3. In a method for obtaining signals representative of magnetic resonance phenomena in particles exhibiting paramagnetic properties wherein a unidirectional magnetic field is applied to said particles, the steps of nutating the macroscopic magnetic moments associated with said particles, periodically reversing the direction of the nutation of said moments, and periodically effecting a substantial shift in the average level of said unidirectional magnetic field correspondingly to shift the precession of the components of said moments perpendicular to said magnetic field through a predetermined angle at times when the total nutation of said moments in one direction is substantially equal to the total preceding nutation in the other direction.

4. In a method for obtaining signals representative of magnetic resonance phenomena in particles exhibiting paramagnetic properties wherein a unidirectional magnetic field is applied to said particles, the steps of nutating the macroscopic magnetic moments associated with said particles, periodically reversing the direction of the nutation of said moments, and periodically effecting a substantial shift in the average level of said unidirectional field correspondingly to shift by substantially 180° the precession of the components of said moments perpendicular to said magnetic field at times when the total nutation of said moments in one direction is substantially equal to the total preceding nutation in the other direction.

5. In a method for obtaining signals representative of magnetic resonance phenomena in particles exhibiting paramagnetic properties wherein a unidirectional magnetic field is applied to said particles, the steps of nutating the macroscopic magnetic moments associated with said particles, periodically reversing the direction of the nutation of said moments, effecting a substantial shift in the average level of said unidirectional magnetic field correspondingly to shift by substantially 180° the precession of the components of said moments perpendicular to said magnetic field at times when the total nutation of said moments in one direction is substantially equal to the total preceding nutation in the other direction, and interrupting said nutations during the periods of shift.

6. Apparatus for detecting magnetic resonance phenomena in particles exhibiting paramagnetic properties comprising means for applying a substantially unidirectional magnetic field of a first intensity to said particles, means for periodically applying an alternating magnetic field to said particles during periods of time long with respect to the intervals between said periods, said alternating magnetic field being applied substantially at right angles to said unidirectional field and at a frequency substantially equal to the resonance precession frequency of said particles in the unidirectional field of said first intensity, means for changing the average intensity of said unidirectional field from said first intensity to a second intensity during said intervals, and means responsive to magnetic resonance in said particles for deriving a signal at the resonance precession frequency during said periods.

7. A method for obtaining an enhanced magnetic resonance signal from particles exhibiting paramagnetic properties in the presence of a unidirectional magnetic field comprising the steps of subjecting said particles to a magnetic field effectively rotating at a frequency which produces resonant precession of said particles, momentarily shifting the average value of said unidirectional magnetic field to a substantially different level for a time required to shift by substantially 180° the resonant precession of said particles, and deriving a resonance signal from said particles while subjected to said unidirectional magnetic field.

8. A method for obtaining an enhanced magnetic resonance signal from particles exhibiting paramagnetic properties in the presence of a unidirectional magnetic field comprising the steps of subjecting said particles to a magnetic field effectively rotating at frequency tending to produce resonant precession of said particles, rapidly shifting the average value of said unidirectional magnetic field by an amount substantially greater than the inhomogeneity of such field to subject said particles to a different level of field strength for a time intermediate the application of said rotating magnetic field sufficient to shift by substantially 180° the resonant precession of said particles, and deriving a resonant signal from said particles while subjected to said unidirectional magnetic field and said rotating magnetic field.

9. In a method for obtaining signals representative of magnetic resonance phenomena in particles exhibiting paramagnetic properties wherein a unidirectional magnetic field is applied to said particles, the steps of periodically nutating the macroscopic magnetic moments associated with said particles, intermediate such nutations abruptly effecting a substantial shift in the average level of said unidirectional magnetic field at times when said nutated moments are substantially in line with said magnetic field, correspondingly to shift the precession of the components of said moments perpendicular to said magnetic field through a predetermined angle, and deriving a signal at the precessional frequency of the nutated macroscopic magnetic moments representative of magnetic phenomena in said particles.

10. In a method for obtaining signals representative of magnetic resonance in particles exhibiting paramagnetic properties wherein a unidirectional magnetic field is applied to said particles, the steps of nutating the macroscopic magnetic moments associated with said particles, and abruptly effecting a substantial shift in the average level of said unidirectional magnetic field at times when said moments are substantially in line with said magnetic field correspondingly to shift by substantially 180° the precession of the components of said moments perpendicular to said magnetic field with respect to their plane of nutation.

References Cited in the file of this patent

UNITED STATES PATENTS

| | | |
|---|---|---|
| 2,700,147 | Tucker | Jan. 18, 1955 |
| 2,705,790 | Hahn | Apr. 5, 1955 |
| 2,721,970 | Levinthal | Oct. 25, 1955 |
| 2,759,170 | Anderson et al. | Aug. 14, 1956 |

OTHER REFERENCES

Hahn: Physical Review, Vol. 80, No. 4, pp. 580–593, Nov. 15, 1950.

Hahn: Physics Today, November 1953, pp. 4–9.

Reif et al.: Physical Review, Vol. 91, No. 3, Aug. 1, 1953, pp. 631 to 641.

Brown: Physical Review, Vol. 78, No. 5, June 1, 1950, pp. 530 to 532.

Torrey: Physical Review, Vol. 76, Oct. 15, 1949, article entitled, "Transient Nutations in Nuclear Magnetic Resonance," pages 1059–1066.